March 29, 1960 C W. MUSSER 2,930,253
WAVE GENERATOR
Filed Feb. 26, 1958 2 Sheets-Sheet 2
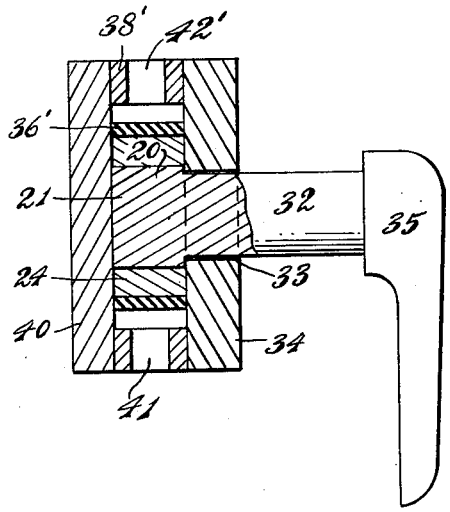
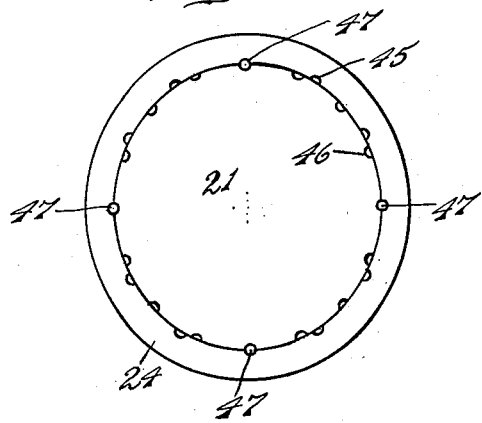
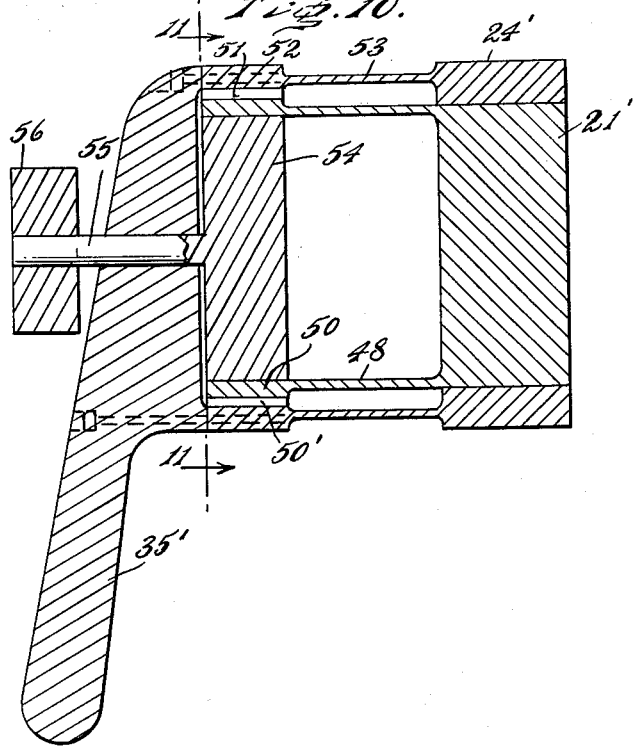
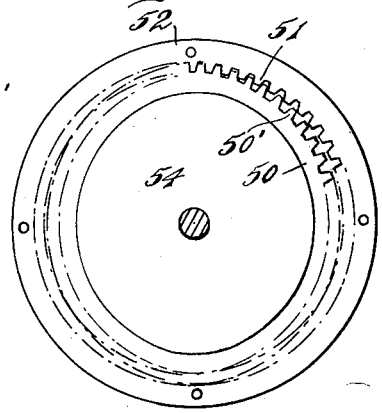
INVENTOR
C. Walton Musser
BY
ATTORNEYS.

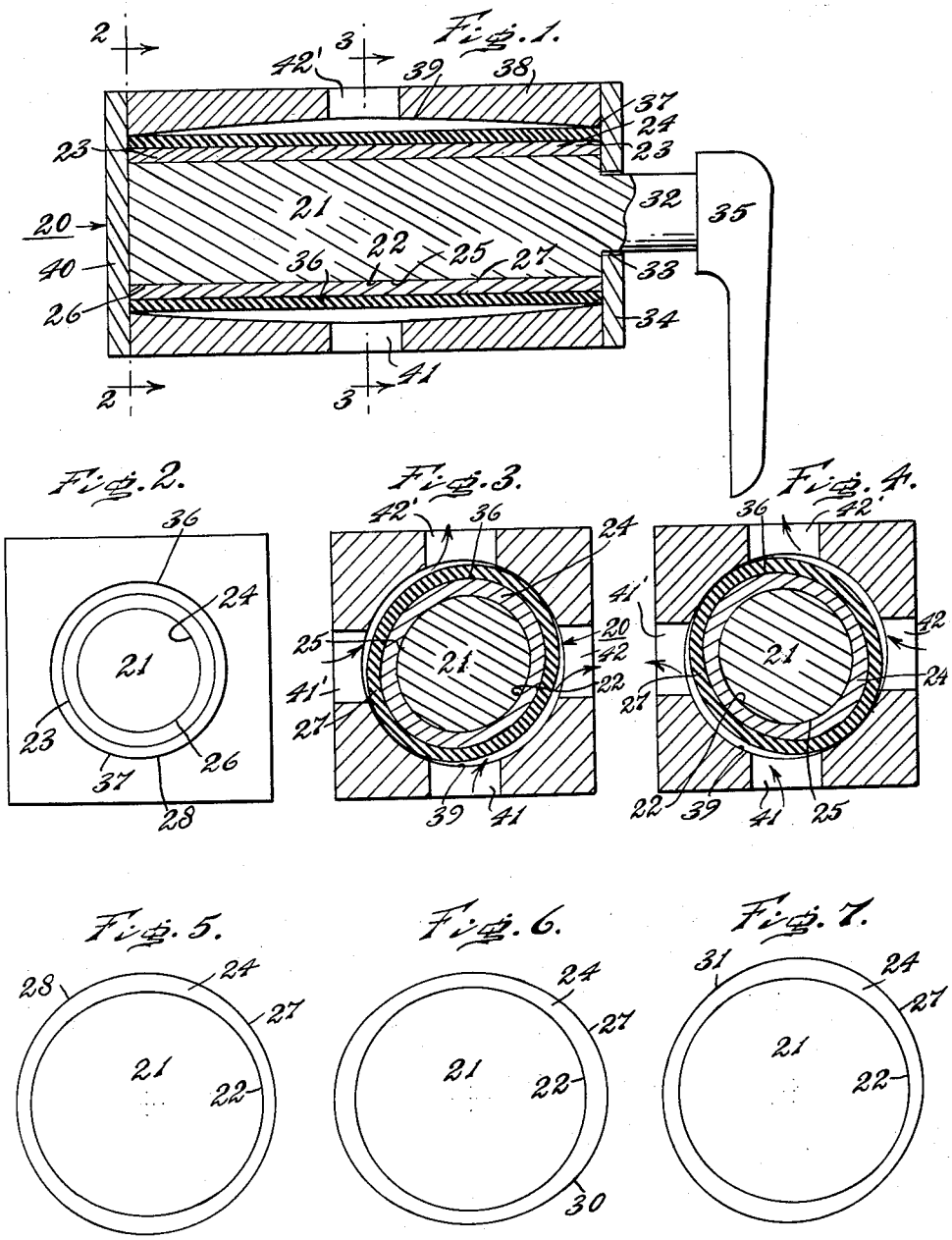

United States Patent Office 2,930,253
Patented Mar. 29, 1960

2,930,253

WAVE GENERATOR

C Walton Musser, Beverly, Mass., assignor to United Shoe Machinery Corporation, Boston, Mass., a corporation of New Jersey Application February 26, 1958, Serial No. 717,709

12 Claims. (Cl. 74—568)

The present invention relates to cams and particularly to wave generators of adjustable magnitude.

A purpose of the invention is to permit creation of a sine wave on a wave generator, with adjustment of the amplitude of the sine wave while adjusting angular position.

A further purpose is to permit the adjustment of a cam-like element such as a wave generator to change its loading properties, particularly in respect to preloading of gearing or the like, adjustment for backlash, adjustment for wear, or adjustment to eliminate variations in manufacture.

A further purpose is to permit the assembly of an elliptoidal wave generator by creation of an external circular contour for assembly purposes.

A further purpose is to permit adjustment of the working surface of a cam to vary between a circle at one point and varying elliptoids of different amplitudes at other points.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

Figure 1 is a diagrammatic axial section of a four-way valve to which the principles of the invention have been applied.

Figure 2 is a section of Figure 1 on the line 2—2.

Figure 3 is a section of Figure 1 on the line 3—3.

Figure 4 is a section corresponding to Figure 3 in a different valve setting position.

Figures 5, 6 and 7 are enlarged diagrams corresponding to Figure 3 showing various adjustment positions of the wave generator.

Figure 8 is an axial section of a modified four-way valve in accordance with the invention, illustrating sealing by engagement with end plates.

Figure 9 is a diagrammatic front elevation showing one means of maintaining the wave generator elements in adjustment.

Figure 10 is an axial section of a further modification of the valve of the invention, illustrating gearing for adjusting the wave generator.

Figure 11 is a section on the line 11—11 of Figure 10.

Describing in illustration but not in limitation, and referring to the drawings:

There are numerous applications in the art in which a wave generator suitably of elliptoidal exterior contour is desirably adjusted to change its amplitude. When the term elliptoid is referred to herein it is intended to refer to a contour which resembles an ellipse. It differs however in that it has two wave lengths, usually but not necessarily of sine wave form, superimposed on a circle in 360°. When the word elliptoidal is referred to, it is intended to mean having the character of an elliptoid. While I have chosen in the present application to illustrate the subject matter primarily applied to a four-way harmonic valve, it will be evident that the principles of the invention can be used to adjust the lobe amplitude on cams generally, and in connection with adjustment of wave generators employed in harmonic gearing of the type illustrated in my copending applications Serial Nos. 495,-479, filed March 21, 1955, for Strain Wave Gearing; 633,254, filed January 9, 1957, for Strain Wave Gearing-Linear Motion; 656,572, filed May 2, 1957, for Dual Strain Wave Gearing; 662,814, filed May 31, 1957, for Strain Wave Axail Valve; 662,743, filed May 31, 1957, for Strain Wave Rotary Valve.

There are a number of different purposes for which adjustment of amplitude in a wave generator may be desirable. In assembly of equipment involving a wave generator, it is advantageous to avoid the necessity of assembling the wave generator when it is elliptoidal, and in accordance with the present invention, in one embodiment, the wave generator can be adjusted until the exterior contour is circular for the purpose of assembly, and then after assembly readjusted to make the exterior contour elliptoidal.

A further purpose for which adjustment may be required in accordance with the invention is to change the load applied to harmonic gearing, or to any other surface on which the wave generator applies load, for such purposes as adjustment of prestress or preload in the system, adjustment to eliminate backlash in gearing, adjustment for wear, and adjustment to compensate for manufacturing errors.

Considering now the form of Figures 1 to 7 inclusive, I there illustrate a wave generator 20 which includes an inner element 21 which has an exterior periphery or contour of curvilinear form which is elliptoidal in the center as shown in Figures 3, 4, 5, 6 and 7 at 22, and which merges into a circular exterior contour at the ends at 23.

The inner element 21 is surrounded by an outer wave generator element 24 which is a deformable or elastic tube, which in the simplest and preferred embodiment is elliptoidal at the center at 25 on the inside and merges to a circle at the inside at each end at 26 exactly engaging and conforming to the outside of the inner wave generator element. The exterior 27 of the outer element 24 from end to end as initially produced is preferably a circle in cross section in the simplest and preferred embodiment. It will be evident that as initially produced, the external wave generator element 24 can have a circular bore and a non-circular external contour so that when the internal contour is deflected by placing it on inner element 21, in at least one angular position, the exterior contour is circular.

By changing the angular relationship of the outer wave generator element with respect to the inner, as shown in Figures 5, 6 and 7, it is possible to change the amplitude of the wave superimposed on the exterior periphery of the outer wave generator element 24. Thus in Figure 5 where the difference between the horizontal dimension at the major axis and the vertical dimension at the minor axis of the inner element 21 equals the total wall thickness of the outer element 24 along the vertical axis minus the total wall thickness of the outer element along the horizontal axis, the outer contour of the outer element becomes a circle 28. On the other hand, as in Figure 6 where the outer element 24 is adjusted 90° with respect to the inner element 21, and the thickest portions of the outer element are along the major axis of the inner element, there is a maximum amplitude of the outer elliptoidal contour as shown at 30. In an intermediate position of adjustment as in Figure 7, the contour of the outer elliptoid as shown at 31 is intermediate between the extreme amplitude of the elliptoid in Figure 6 and the circle in Figure 5. These differences are merely due to the angular adjustment of the outer deflectable tube with respect to the inner element.

Where the condition of equality set forth above does not actually exist, but is approached, some advantage of the invention is obtained and there will be a condition of variation of the elliptoidal exterior contour, even though no condition having a circular exterior contour of Figure 5 will obtain.

For the purpose of the present discussion when an elliptoid is referred to, it is intended essentially to designate two sine waves which completely occupy the 360° periphery and have their crossover points at 90°. These two sine waves are superimposed on a circle with the peak of the wave the same distance above the circle that the valley is below the circle.

Since the periphery of the inner element 21 is essentially of similar dimension throughout its length, the assembly of the outer wave generator element can be made by sliding it on from the end of the inner element with the outer element deflecting to fit the outer contour of the inner element throughout the entire sliding motion. Similarly the periphery of the elliptoidal contour of the outer element is essentially the same at all axial positions. Of course the periphery of the inner element is essentially the same as the periphery of the inner contour of the outer element.

The force required to readjust the wave generator exterior contour will be relatively great compared to the force required to simply turn the wave generator.

The wave generator elements may be bodily turned by turning a shaft 32 on the inner wave generator element extending through a bearing 33 in end plate 34.

The wave generator may operate in any of a number of different ways, the particular illustration shown in Figures 1 to 7 showing a tubular valve element 36 which is initially of circular interior and exterior cross section, and which is deflected so that at the center it has an elliptoidal cross section as shown in Figures 3 and 4, and at the end the cross section remains circular as shown in Figure 2.

The valve element at the ends suitably seals at 37 to the interior of a casing 38 whose interior 39 is circular in cross section throughout but enlarges in diameter from a minimum at the end to a maximum at the center.

The opposite end from the casing is suitably closed by an end plate 40.

At suitably diametrally opposed positions ports 41, 41', 42 and 42' are made at the center of the casing.

The wave generator will suitably be made of metal, any desirable elastic structural metal being used, such as stainless steel, steel, bronze, or the like. The valve element in many cases will likewise be of an elastic metal, such as steel, stainless steel, or bronze, and in that case the seal at 37 will be made preferably by brazing or welding. In some instances, however, the valve element 36 may be made of plastic or elastomer, suitable examples being nylon, polyethylene, rubber, polytetrafluoroethylene, and synthetic rubber such as neoprene. In this case the seal at 37 may be a pressure tight seal.

The casing and end plates will in some cases be made of rubber, or of a rigid plastic, although preferably metal such as stainless steel, steel, bronze or the like will be used.

In assemblying the device, with the end plate 34 removed, the valve interior will be assembled with respect to the casing, and in the case of a metal valve element 36 and metal casing, can be suitably brazed or welded to the casing. In order to insert the valve element, it will be necessary that elements 21 and 24 of the wave generator be angularly adjusted so that the wave forms cancel each other and the exterior is circular throughout as shown in Figure 5. In this adjustment position the wave generator with the valve element around it can be slipped into the interior of the valve casing. The wave generator elements will then be readjusted until in the sealing positions of Figures 3 and 4 an appropriate sealing preload is obtained by the valve element against the casing, leaving the flow paths on opposite sides of the four-way valve unrestricted as shown, in Figure 3 from 41 to 42, and from 41' to 42'. By shifting the position of the wave generator 90° from Figure 3 to Figure 4, the flow is from 41 to 41, and from 42 to 42'.

The adjustment of the wave generator into the position shown can be simply accomplished by forced fitting, that is gripping the one wave generator element by a suitable clamp or wrench and forcing the other around to the predetermined position, although as later explained the setting may be more positively determined and controlled if desired.

In Figure 8, I illustrate a simplified form of the four-way valve of Figures 1 to 7, in which the wave generator elements 21 and 24 are essentially the central portions of the other construction, and the valve element 36' is essentially the same as in the other form, except that it makes end seals against the plates and is free to move radially as it is deflected. The casing 38' is in this case of generally uniform circular interior bore corresponding to the central portion of the forms of Figures 1 to 7.

In Figure 9, I illustrate a device for maintaining the adjustment of the inner wave generator element 21 with respect to the outer 24. The outer surface of the outer element 24 is elliptoidal and the inner surface of this element is circular when relaxed and the outer surface of the inner element 21 is elliptoidal. In this case, the adjoining surfaces have at predetermined points half holes 45 and 46 which can be matched in any desired relation, changing the angular position of the inner and outer elements, and then keyed together as by inserting keys or other fastening means 47 in the mating holes. Thus shifting the angle of the outer to the inner element changes the amplitude of the outer elliptoid.

In the case of Figure 9, the amplitude of the wave on the outer ring 24 is made appreciably less than that of the inner element 21. This permits a minute adjustment of wave generator dimensions with an appreciable angular motion of the outer element with respect to the inner element.

The form of Figures 10 and 11 illustrates harmonic gearing used to adjust the wave generator elements. In this case the inner wave generator element 21' is connected by a flexible tube 48 to a flex gear 50 which has external teeth 50', which at a plurality, suitably two, opposed points engage interior teeth 51 on a ring gear 52 which flexibly connect by a flexible tube 53 with the outer wave generator element 24', which is surrounding and engaging the inner element 21', which may be those already described. A wave generator 54, suitably of elliptoidal exterior contour, engages the inside of the flex gear 50 and maintains it into intermeshed mating engagement, with intermediate nonmating positions, with respect to the surrounding gear 52.

The teeth on the inner and outer gears 50 and 52 are of the same tooth form but differ slightly in number of teeth, and the difference in the number of teeth in the two sets corresponds to or is a multiple of the number of lobes on the wave generator 54.

For the purpose of relative adjustment, the wave generator 54 is connected by shaft 55 with an adjustment handle 56 which extends through and is accessible beyond handle 35'. Handle 35' rotates the wave generator 21', 24' to cause operation of the valve. Handle 56 adjusts the preload or other setting on the wave generator.

It will of course be evident that the wave generator 54 can itself be adjusted in accordance with the present invention, as by inserting the construction of Figure 9 instead of the element 54.

It will be evident in the operation of the device of the invention that according to a law of physics when two sine waves of the same wave length are superimposed on one another, they produce another sine wave regardless of their phase relationship. The new sine wave which is the resultant differs in amplitude and thus the combination of the two sine waves permits adjustment of amplitude as already explained.

In view of my invention and disclosure, variations and modifications to meet individual whim or particular need will doubtless become evident to others skilled in the art to obtain all or part of the benefits of my invention without copying the structure and method shown, and I, therefore, claim all such insofar as they fall within the reasonable spirit and scope of my claims.

Having thus described my invention, what I claim as new and desire to secure by Letters Patent is:

1. A wave generator comprising an inner element having an elliptoidal periphery, an outer deflectable tubular element surrounding and engaging the periphery of the inner element and having on at least one of its surfaces as initially formed an elliptoidal periphery, the outer element being adapted for adjustment of its angular relationship with respect to the inner element.

2. A wave generator of claim 1, in combination with means to secure the outer element in a particular angular relationship with respect to the inner element.

3. A wave generator of claim 1, in which the difference between the dimension on the major axis and the dimension on the minor axis of the elliptoid in the inner element is equal to the difference between the dimension of the major axis and the dimension of the minor axis of the elliptoid in the outer element, and in one angular relationship the exterior contour of the outer element is a circle.

4. A wave generator of claim 1, in which the difference between the dimension on the major axis and the dimension on the minor axis of the elliptoid of the inner element is different from the difference between the dimension on the major axis and on the minor axis of the elliptoid of the outer element, and in all angular relationships the exterior contour of the outer element is an elliptoid.

5. A wave generator of claim 1, in combination with gearing means acting between the inner element and the outer element and manipulating the two elements into different adjusted relative angular positions.

6. A wave generator of claim 1, in which the exterior perimeter of the inner element substantially equals the interior periphery of the outer element at any position along the lengths of the elements.

7. A wave generator of claim 1, in which the exterior perimeter of the inner element changes its elliptoidal contour but retains the same periphery at all axial positions.

8. A wave generator of claim 1, in which the outer element has an elliptoidal contour which varies in elliptoidal contour along its length but has the same perimeter at any axial position.

9. In a cam, an inner cam element having an outer periphery provided with a lobe which extends radially outward with respect to another part of the periphery, an outer deflectable tubular element having a lobe which protrudes radially beyond the periphery of other parts of the tubular element, the outer tubular element surrounding and engaging the inner element, and the outer element being adapted to change its angular adjusted relationship with respect to the inner element in order to relatively deflect the outer element and change the radial protrusion of the lobe on the outer element.

10. A cam consisting of an inner element having an exterior periphery, and an outer deflectable tubular element having an interior periphery which engages and surrounds the inner element and having an exterior periphery, the exterior periphery of the inner element, the interior periphery of the outer element and the exterior periphery of the outer element in all relative angular positions of the inner and outer elements with respect to one another conforming to the same geometrical figure with difference in magnitude of radial dimension.

11. In a machine element, an inner element having an elliptoidal cross section, an outer deflectable element surrounding the inner element and having an elliptoidal interior contour conforming to the exterior contour of the inner element, the inner and outer elements being circumferentially adjustable with respect to one another, the outer contour of the outer element in one position of adjustment being elliptoidal and in another position of adjustment being circular in cross section.

12. In a machine element, an inner element of elliptoidal cross section, an outer deflectable element surrounding the inner element having an interior surface conforming to the outside of the inner element, the inner and outer elements being circumferentially adjustable with respect to one another, the outer element having a contour which in one position is elliptoidal and of one amplitude, and which in another position is elliptoidal and of a different amplitude.

References Cited in the file of this patent

UNITED STATES PATENTS 2,709,924     Castelli _____ July 7, 1955